(12) United States Patent
Donin De Rosiere

(10) Patent No.: US 10,237,353 B2
(45) Date of Patent: Mar. 19, 2019

(54) METHOD AND SYSTEM FOR DISCOVERING THE TOPOLOGY OF THE COMMUNICATIONS BETWEEN APPLICATIONS OF A COMPUTER NETWORK

(75) Inventor: Emmanuel Donin De Rosiere, Antony (FR)

(73) Assignee: INFOVISTA SAS, Massy (FR)

( * ) Notice: Subject to any disclaimer, the term of this patent is extended or adjusted under 35 U.S.C. 154(b) by 964 days.

(21) Appl. No.: 12/668,924

(22) PCT Filed: Jul. 11, 2008

(86) PCT No.: PCT/FR2008/051324
§ 371 (c)(1),
(2), (4) Date: Jan. 13, 2010

(87) PCT Pub. No.: WO2009/013428
PCT Pub. Date: Jan. 29, 2009

(65) Prior Publication Data
US 2010/0191857 A1   Jul. 29, 2010

(30) Foreign Application Priority Data
Jul. 13, 2007   (FR) .................................. 07 56500

(51) Int. Cl.
*H04L 12/24* (2006.01)
*H04L 29/08* (2006.01)

(52) U.S. Cl.
CPC .............. *H04L 67/16* (2013.01); *H04L 41/12* (2013.01); *H04L 41/0213* (2013.01)

(58) Field of Classification Search
CPC ...... H04L 41/12; H04L 41/0213; H04L 42/02
USPC .......................................... 709/228
See application file for complete search history.

(56) References Cited

U.S. PATENT DOCUMENTS

| | | | |
|---|---|---|---|
| 2003/0145079 A1* | 7/2003 | Breese et al. ................. | 709/224 |
| 2006/0136504 A1* | 6/2006 | Babutzka ............... | G06Q 10/10 |
| 2006/0212569 A1* | 9/2006 | Ammerman, III ...... | H04L 67/16 |
| | | | 709/224 |
| 2007/0058631 A1* | 3/2007 | Mortier et al. ............... | 370/392 |
| 2011/0138042 A1* | 6/2011 | Ohta et al. .................... | 709/224 |

* cited by examiner

Primary Examiner — David R Lazaro
Assistant Examiner — Xiang Yu
(74) Attorney, Agent, or Firm — Greer, Burns & Crain, Ltd.

(57) ABSTRACT

A method for discovering the topology of communications between applications of a computer network having several items of equipment, the method including the following steps: a) connecting to each of the items of equipment of the network, b) for each item of equipment, acquiring raw data relating to applications hosted within the item of equipment, c) for each item of equipment, acquiring connection data for each live connection established by an application, d) from the raw data and the connection data thus obtained, communication links are determined respectively between pairs of applications of the network, and e) a level-7 topology of the network is generated from the communication links.

14 Claims, 2 Drawing Sheets

|  | name | IP used | Port used | CPU | Memory | PID |
|---|---|---|---|---|---|---|
| Item of equipment A | APA1 | 212.1.1.1 | 2 | ... | ... | 100 |
|  | APA2 | 212.1.1.2 | 1 | ... | ... | 88 |
| Item of equipment B | APB1 | 213.1.1.4 | 1 | ... | ... | 44 |
| Item of equipment C | APC1 | 214.1.1.5 | 1 | ... | ... | 22 |

FIGURE 2

| Item of equipment B ||||||| 
|---|---|---|---|---|---|---|
| Connection | source IP | source Port | destination IP | destination Port | Protocol | PID |
| Connection 1 | 213.1.1.4 | 1 | 212.1.1.2 | 1 | TCP | 44 |
| Connection 2 | 213.1.1.4 | 1 | 214.1.1.5 | 1 | UDP | 44 |

FIGURE 3

METHOD AND SYSTEM FOR DISCOVERING THE TOPOLOGY OF THE COMMUNICATIONS BETWEEN APPLICATIONS OF A COMPUTER NETWORK

BACKGROUND

The present invention relates to a method and a system for discovering the topology of the communications between applications of a computer network.

The conventional mechanisms for discovering the topology of a network usually make it possible to obtain the topology from a level-1 viewpoint according to the OSI classification, i.e. the physical topology of the network: the different elements constituting the network as well as the way in which they are connected to each other, by cables for example. Other mechanisms also make it possible to obtain the topology from the viewpoint of layer-2 of the OSI model, i.e. defining with which items of equipment a given element is capable of communicating directly. Other mechanisms make it possible to discover the topology of layer-3 of the OSI network model, i.e. the different sub-networks existing as well as the manner in which they are interconnected.

However, the present invention relates to the discovery of the topology of level-7 of the OSI network model, i.e. the topology of the communications between the applications executed on the items of equipment of the network.

Conventional methods of discovery of the topology of the communications between applications use a passive probe within the network, i.e. the latter has no interaction with the network. It simply captures the different communications carried out within the network and by analyzing these communications, tries to discover the list of applications on the network as well as the links between them. Nevertheless, this method has a number of drawbacks. In fact, the probe must be arranged at a point of the network through which all the communications pass, in order to be able to create the topology of the whole network. If there is no point of this type, it therefore becomes necessary to use several probes which must work together in order to enable the network to be fully characterized. Moreover, the probe(s) are only aware of the communications between the applications, they are therefore not capable of retrieving certain information which does not pass through the network, such as for example the name of the application, the execution time, memory used, etc. Similarly, due to the lack of information, the probe(s) are not capable of distinguishing two identical applications located on the same item of equipment of the network.

The purpose of the present invention is to overcome the above-mentioned drawbacks by proposing a novel method for discovering the topology of the communications of the applications on a network.

SUMMARY

The purpose of the present invention is a method allowing the topology of the communications of a network to be exhaustively determined.

Another purpose of the invention is to determine this topology quickly.

At least one of the above-mentioned objectives is attained with a method for discovering the topology of the communications between applications of a computer network comprising several items of equipment, this method comprising the following steps:

a) connecting to each of the items of equipment of the network, by using one and/or several administration protocols such as SNMP, SSH, etc., b) for each item of equipment, acquiring raw data relating to applications hosted within this item of equipment, c) for each item of equipment, acquiring connection data for each live connection established by an application, corresponding to level-3 or above data in the OSI model, d) based on the raw data and the connection data thus obtained, communication links are determined respectively between pairs of applications of said network; in other words any link existing between the applications, taken in pairs, is determined; and e) a level-7 topology of said network is generated from said communication links.

With the method according to the invention, each item of equipment of the network is polled. The set of applications is listed and any link there may be between two given applications is established. A complete topology of the network is produced. This topology can be produced quickly as all of the data collected within a processing server is returned. This topology can be saved in the form of an XML file that is stored in a database. Any other storage method, whether permanent or not, can be used.

According to an advantageous embodiment of the invention, in order to determine said communication links, a first calculation phase is carried out, during which, for each item of equipment, the corresponding application which initiated a connection is associated with said connection; and a second calculation phase is carried out during which, for each item of equipment, the corresponding application which was the recipient of this connection is associated with each connection.

Thus correspondences at each end of a connection are produced.

Advantageously, the raw data can comprise:
the name of each application,
the IP address used in normal circumstances by this application, and
the port used in normal circumstances by this application, According to the invention, the connection data can comprise:
the protocol used for each connection established,
the source IP address,
the source port,
the recipient IP address, and
the recipient port.

Preferably, the connection data comprise moreover the PID (process identifier) number used for each communication during a connection. When a PID can be retrieved at each communication of a connection, it is possible to associate therewith, the corresponding application which initiated this communication. Similarly, at each communication of a connection, it is possible to associate therewith, the corresponding application which was the recipient of this communication.

According to an advantageous feature of the invention, the association between a connection and the corresponding application in the first calculation phase comprises a step of comparison between on the one hand, the source IP address and the source port, and on the other hand, the IP address used and the port used.

Similarly, the association between a connection and the corresponding application in the second calculation phase comprises a step of comparison between on the one hand, the recipient IP address and the recipient port, and on the other hand, the IP address used and the port used.

Advantageously, the raw data can comprise moreover performance data of each application, such as data relating to memory use by the application and the CPU usage of this application.

Additional information on the applications is therefore obtained, this information being different to the information passing through the network. This therefore makes it possible to obtain a topology that is richer than a topology obtained with a conventional method according to the prior art.

Aggregation can be carried out from the set of acquired data so as to obtain numerous items of information on a given communication; this information being obtained from both ends of said communication. This information redundancy here makes it possible to avoid any problem of the prior art due to the topography of the network at level-3 of the OSI model, such as network address translation (NAT). With the information redundancy obtained by polling the communication from both ends, it is possible in certain cases to reconstruct the exact communication having taken place by dispensing with intermediaries used due to NAT.

According to an embodiment of the invention, steps a) to e) are carried out in a regular fashion.

This topology discovery (polling of the applications of the items of equipment by the steps a) to e)) can also be carried out in a planned fashion (daily, weekly, etc.) in order to monitor the development of the topology or determine it once for all at a given moment.

By way of example, the steps a) to e) can be carried out in response to a predetermined instruction. This can be an instruction triggered by a user or an alarm generated automatically for example when a problem occurs on the network.

According to another aspect of the invention, a server is proposed for discovering the topology of communications between applications of a computer network comprising several items of equipment, this server comprising means for:

a) connecting to each of the items of equipment of the network, b) for each item of equipment, acquiring raw data relating to applications hosted in this item of equipment, c) for each item of equipment, acquiring connection data for each live connection established by applications, d) from the raw data and the connection data thus obtained, determining communication links respectively between pairs of applications of said network, and e) generating a level-7 topology of said network from said communication links.

BRIEF DESCRIPTION OF THE DRAWINGS

Other features and advantages of the invention will become apparent upon examination of the detailed description of an embodiment which is in no way imitative, and the attached drawings, in which:

FIG. 2 is a table illustrating raw data obtained after polling the applications of the items of equipment of the network, and FIG. 3 is a table illustrating connection data obtained after polling the connections relating to the item of equipment B.

DETAILED DESCRIPTION

Figure 1:
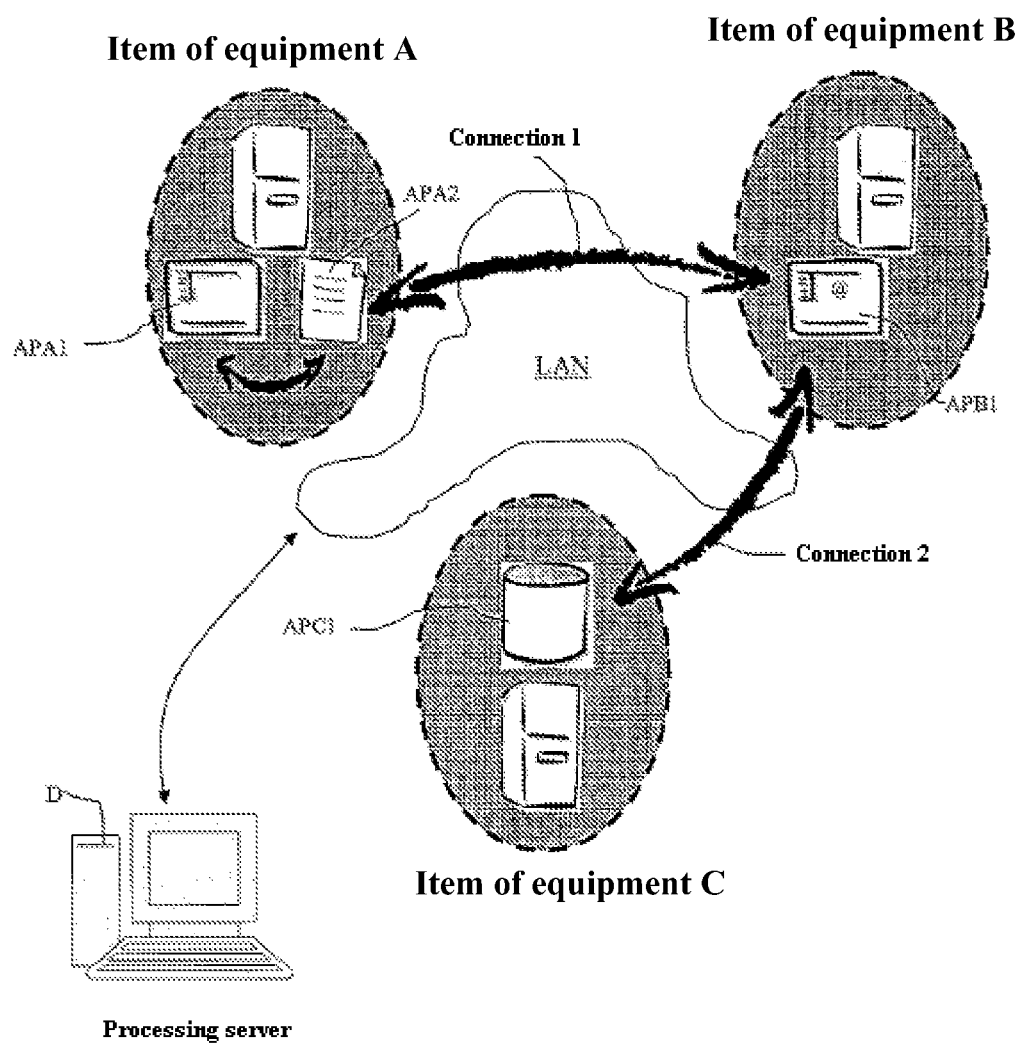
FIG. 1 is a general view of a network implementing the method according to the present invention.

FIG. 1 shows a local network (LAN) comprising three items of equipment A, B and C, as well as a processing server D according to the invention. This processing server is equipped with standard hardware and software means allowing its correct operation in a communication network. It also includes an application according to the invention allowing it to connect to each item of equipment of the network in order to carry out analysis and data acquisition operations. Each item of equipment comprises an application allowing the processing server to acquire data via an administration protocol.

The item of equipment is a machine comprising in particular two applications APA1 and APA2. These applications can intercommunicate and also communicate with other applications contained in other items of equipment of the network. The item of equipment B comprises the application APB1. The item of equipment C comprises the application APC1.

It is proposed to establish the topology of the LAN, i.e. the communication links at level-7 in the OSI model. To this end, the processing server polls each item of equipment in order to retrieve raw data. These data are recorded in the table of FIG. 2.

Thus, for each item of equipment, the name of each application hosted by this item of equipment, the IP address used, the port used as well as data on the memory usage, the CPU usage of the application considered and the PID of the application considered are acquired.

For example, on the item of equipment A, the application called APA1 using the IP address 212.1.1.1 on port 2, as well as the application called APA2 using the IP address 212.1.1.2 on port 1 are detected. On the item of equipment B, the application called APB1 using the P address 213.1.1.4 on port 1 is detected.

On the item of equipment C, the application called APC1 using the IP address 214.1.1.5 on port 1 is detected.

Then, at a given moment or repetitively, connection data are retrieved for each item of equipment. In FIG. 3 the connection data obtained on the item of equipment B at a moment when connection 1 and connection 2 were live, i.e. active, is detected.

Connection 1 is characterized by a source IP address 213.1.1.4, a source port 1, a recipient IP address 212.1.1.2, a recipient port equal to 1, a TCP protocol and a PID process number having a value of 44.

Similarly, connection 2 is allocated from a source IP address equal to 213.1.1.4, a source port equal to 1, a recipient IP address equal to 214.1.1.5, a recipient port equal to 1, a UDP protocol and a PID process number equal to 44.

With the set of data retrieved, the processing server D performs a first calculation phase consisting, for each item of equipment, of making the link between the applications and the connections discovered on this same item of equipment. To this end, the source IP/Port pairs used by the application are compared. The processing server is then capable of allocating to an application all the communications having as source an IP/Port pair used by this application. Advantageously, when the PID process number of each communication is known, the processing server makes the link between the application and the associated communications. In the table of FIG. 3, each communication is associated with PID 44 and therefore with the application APB1.

During the second calculation phase, the processing server makes the link between the destination IP/Port of the communications and the applications discovered on all the items of equipment. The data on the IP/Port pairs discovered during the acquisition of the raw data of the applications is used in the same way as previously.

Using these two steps, the link is made between two given applications of a single network, even if these applications are not located on the same item of equipment.

Of course, the invention is not limited to the examples which have just been described, and numerous adjustments can be made to these examples without exceeding the scope of the invention.

The invention claimed is:

1. A method for discovering the topology of the communications between applications of a computer network comprising several items of equipment, the method comprising the following steps:
   a) connecting a server to each of the items of equipment of the network using an administration protocol;
   b) for each item of equipment, acquiring raw data relating to applications hosted within this item of equipment, said raw data comprising performance data for each application;
   c) for each item of equipment, acquiring connection data for each live connection established by an application;
   d) from the raw data and the connection data thus obtained, determining communication links respectively between pairs of applications of said network;
   e) generating a level-7 topology of said network from said communication links; and
   f) aggregating said acquired raw data by polling both ends of said communication links for achieving information redundancy,
   wherein said communication links are determined using a first calculation phase and a second calculation phase, said first calculation phase being performed for making a first link between a source application and a connection discovered on a source item of equipment based on a source IP address and a source port number, and said second calculation phase being performed for making a second link between the connection and a destination application based on a destination IP address and a destination port number, linking the source application residing on the source item of equipment to the different destination application residing on a destination item of equipment based on said first calculation phase and said second calculation phase.

2. The method according to claim 1, characterized in that in order to determine said communication links, a first calculation phase is carried out, during which, for each item of equipment, the corresponding application which initiated a connection is associated with said connection; and a second calculation phase is carried out during which, for each item of equipment, the corresponding application which was the recipient of this connection is associated with each connection.

3. The method according to claim 2, characterized in that the association between a connection and the corresponding application in the first calculation phase comprises a step of comparison between on the one hand, the source IP address and the source port, and on the other hand the IP address used and the port used.

4. The method according to claim 2, characterized in that the association between a connection and the corresponding application in the second calculation phase comprises a step of comparison between on the one hand, the recipient IP address and the recipient port, and on the other hand, the IP address used and the port used.

5. The method according to claim 1, characterized in that the raw data comprise:
   the name of each application;
   the IP address used by this application; and
   the port used by this application.

6. The method according to claim 1, characterized in that the connection data comprise:
   the protocol used for each connection established;
   the source IP address;
   the source port;
   the recipient IP address; and
   the destination port.

7. The method according to claim 1, characterized in that the connection data include moreover a PID process number used for each communication during a connection.

8. The method according to claim 1, characterized in that the steps a) to e) are carried out in a regular fashion.

9. The method according to claim 1, characterized in that the steps a) to e) are carried out in a planned fashion.

10. The method according to claim 1, characterized in that the steps a) to e) are carried out in response to a predetermined instruction.

11. The method according to claim 1, characterized in that the topology is stored in a database.

12. The method according to claim 1, wherein the performance data acquired comprises data of memory use and of CPU use.

13. A server for discovering the topology of communications between applications of a computer network comprising several items of equipment, the server comprising:
   a) a connecting unit configured for connecting the server to each of the items of equipment of the network using an administration protocol;
   b) a first acquiring unit configured for acquiring raw data relating to applications hosted in each item of equipment, said raw data comprising performance data for each said application;
   c) a second acquiring unit configured for acquiring connection data for each live connection established by said applications for each item of equipment;
   d) a determining unit configured for determining, using a computer processor, communication links respectively between pairs of said applications of said network based on the raw data and the connection data thus obtained;
   e) a generating unit configured for generating a level-7 topology of said network from said communication links; and
   f) an aggregating unit configured for aggregating said acquired raw data by polling both ends of said communication links for achieving information redundancy,
   wherein said communication links are determined using a first calculation phase and a second calculation phase, said first calculation phase being performed for making a first link between a source application and a connection discovered on a source item of equipment based on a source IP address and a source port number, and said second calculation phase being performed for making a second link between the connection and a destination application based on a destination IP address and a destination port number, linking the source application residing on the source item of equipment to the different destination application residing on a destination item of equipment based on said first calculation phase and said second calculation phase.

14. The server according to claim 13, wherein the performance data acquired comprises data of memory use and of CPU use.

* * * * *